(12) United States Patent
Ross

(10) Patent No.: US 7,089,251 B1
(45) Date of Patent: Aug. 8, 2006

(54) METHODS FOR PROCESSING CONDENSED COMPUTER CODE

(75) Inventor: Richard A. Ross, Berkeley, CA (US)

(73) Assignee: Hewlett-Packard and Development Company, L.P., Houston, TX (US)

( * ) Notice: Subject to any disclaimer, the term of this patent is extended or adjusted under 35 U.S.C. 154(b) by 1165 days.

(21) Appl. No.: 09/602,713

(22) Filed: Jun. 26, 2000

Related U.S. Application Data

(63) Continuation of application No. 09/053,260, filed on Apr. 1, 1998, now Pat. No. 6,163,780.
(60) Provisional application No. 60/060,633, filed on Oct. 1, 1997.

(51) Int. Cl.
*G06F 17/30* (2006.01)

(52) U.S. Cl. .......................... 707/101; 707/10; 717/153
(58) Field of Classification Search ................ 707/2, 707/10, 100–101; 717/118, 139, 140–142, 717/144–148, 153

See application file for complete search history.

(56) References Cited

U.S. PATENT DOCUMENTS

| | | | |
|---|---|---|---|
| 5,572,206 A | * | 11/1996 | Miller et al. |
| 5,848,274 A | * | 12/1998 | Hamby et al. .............. 709/331 |
| 5,857,197 A | * | 1/1999 | Mullins |
| 5,907,707 A | * | 5/1999 | Ramalingam et al. |
| 5,920,720 A | * | 7/1999 | Toutonghi et al. |
| 5,999,949 A | * | 12/1999 | Crandall |
| 6,163,780 A | * | 12/2000 | Ross |

FOREIGN PATENT DOCUMENTS

EP  788239 A2  1/1997

OTHER PUBLICATIONS

LeFurgy C, et al: "Improving cod density using compression techniques"Dec. 1, 1997, pp. 194–203.
Lindholm T, Yellin F: "The JavaVirtual Machine Specification" XPOO2310472, chapters 2,4,5;
Proebsting T: "Optimizing an ANSI C Interpreter with Superoperators" XP002202605.
Lambright H: "Java Bytecode Optimizations" XP-000751784.

* cited by examiner

*Primary Examiner*—Shahid Alam

(57) ABSTRACT

Methods for processing condensed computer code are disclosed herein. The condensed computer code includes index references that take the place of code structures found in corresponding executable computer code. The condensed computer code, as well as one or more lists that map the index references found in the condensed computer code to the code structures found in the executable computer code, are transmitted to a user system. The condensed computer code is executed by fetching opcodes and operands from the computer code, and then executing the fetched opcodes. If a fetched operand is an index reference, the fetched operand is resolved by using the index reference as an index into one of the lists.

2 Claims, 12 Drawing Sheets

METHODS FOR PROCESSING CONDENSED COMPUTER CODE

CROSS REFERENCE TO RELATED APPLICATION(S)

This is a continuation of U.S. application Ser. No. 09/053,260 filed on Apr. 1, 1998, now U.S. Pat. No. 6,163,780 which claims the benefit of U.S. Provisional Patent Application Ser. No. 60/060,633, entitled SYSTEM AND METHOD FOR CONCENTRATING SOFTWARE CODE, filed on Oct. 1, 1997.

CLAIM OF PRIORITY

The instant patent application claims priority from U.S. Provisional Patent Application Ser. No. 60/060,633, entitled SYSTEM AND METHOD FOR CONCENTRATING SOFTWARE CODE, filed on Oct. 1, 1997.

COPYRIGHT NOTICE

This patent document contains material which is subject to copyright protection. The copyright owner has no objection to the facsimile reproduction by anyone of the patent disclosure as it appears in the records of the United States Patent and Trademark Office, but otherwise reserves all copyright rights whatsoever.

FIELD OF THE INVENTION

The present invention relates to a method and system for compressing software code, especially bytecode as used in computer systems.

BACKGROUND OF THE INVENTION

Various forms of computer languages and compilers have been developed for the creation, compilation and execution of code segments, sometimes known as "class files," which contain bytecode and data. Such languages include the JAVA language developed by Sun Microsystems, Inc. of Palo Alto, Calif., and the various dialects of that language that have been developed. These computer languages offer the advantages of allowing the creation of code segments that can be stored on a server computer system and transferred from the server computer system to a remote computer system at a desired time. The remote computer system can receive the code segment and execute it locally.

A common use of such code segments is in the transmission of executable code via a remote electronic communications network, such as the Internet or its components, such as the World Wide Web. For example, a server computer or web site can be contacted by a remote user computer system by specifying a worldwide web "address." The user system receives the bytecode by transmission over the computer network. The user system executes an interpreter, such as a JAVA interpreter or other software containing appropriate code for receiving and executing the bytecode.

One disadvantage of such known computer languages is that the transmitted code segments often contain unnecessary code and/or data, making the code segment longer and making transmission and execution of the code segment more burdensome. A longer code segment naturally takes longer to transmit via a computer network than one which is shorter. For example, the code segment may contain methods or fields which are not actually required for execution in the user or destination computer system. The code segment may also contain repetitive use of particular classes, methods or fields or other code.

In operation, received code segments typically are stored in memory in the user or destination system. The memory may include a non-volatile storage medium such as a hard disk or writable CD-ROM or volatile memory such as RAM (random access memory). Because the code segments may include unneeded components or multiple instances of the same component, they may require an excessive amount of such memory storage. Furthermore, the longer code will also entail longer access and execution times.

The JAVA language and associated interpreters are widely known. Code segments, or class files, generated using JAVA contain method definitions and field specifications. Objects, which are instances of classes, are collections of fields and methods that operate on fields. Methods may call each other via invocations and objects may pass data among each other via methods, such as for private fields, or via direct field references, such as for public fields.

A method is code used to perform a particular task, such as modifying data in some way, such as for performing a procedure or a function.

Fields are components of objects in which object data are stored such as integers or characters, i.e., variables. Data may be designated as public or private. Private data is generally accessible by a single class while public data is accessible by multiple classes.

Data may also be characterized as static or instance data. Static data is associated with each class, whereas instance data is associated with each object, or instance of a class. In a typical JAVA code implementation, a class file is read by the interpreter and executed according to the meaning of the code within the class file.

There is a need for a system and method for compressing bytecode or code segments and for interpreting and executing such compressed code.

SUMMARY OF THE INVENTION

An object of the present invention is to provide a system for receiving bytecode and condensing the bytecode. The present invention also provides a system and method for interpreting and executing the condensed bytecode.

It is another object of the present invention to provide a system and method for removing unused or unneeded classes, methods and/or fields from bytecode and generating condensed code.

Another object of the present invention is to provide a system and method for receiving bytecode, condensing it and then transmitting it via a computer network, such as the Internet.

By providing a method and system for condensing bytecode or computer code, the present invention alleviates to a great extent the disadvantages of known systems and methods for generating bytecode or computer code, such as used with the JAVA computer language and associated interpreters and transmission systems. In a preferred embodiment, list processing and indexing is used to create indexes of various code structures. Index listings of each of the types of code structures preferably are created. The index listings contain listings of identifiers corresponding to the particular instances of the respective code structures occurring within the bytecode and index references corresponding to each of the identifiers included in the listing. The bytecode is reduced in size by replacing the various identifiers appearing in the bytecode with the corresponding index references. In this way, for example, code structures are replaced with index references within the bytecode and an index containing the data structure is maintained.

More particularly, in an embodiment applicable to typical JAVA-based computer code, or bytecode, the data structures include classes, methods and fields. Listings of the classes, methods and/or fields appearing in the JAVA bytecode are created by systematically reviewing the JAVA bytecode to identify each instance of a particular class, method and/or field, respectively. These listings are sorted to create respective canonical listings or indexes of the classes, methods and/or fields. These listings include reference indicators, such as index locations or pointers, assigned to each of the classes, methods and/or fields in the respective sorted lists. The JAVA bytecode is revised so that the index locations of the classes, methods and/or fields replace the identifiers of the classes, methods and/or fields originally in the bytecode. In other words, each class reference in the bytecode is replaced with a reference to the location of the class within the sorted class list, each method reference is replaced with a reference to the location of the method within the sorted method list and each field reference is replaced with a reference to the location of the field within the sorted field list.

Furthermore, a scan of the bytecode may also preferably be performed for every class and method in the lists to identify and note in an array any local data or constants referenced in the bytecode. The data references for the local data or constants within the bytecode are changed to indicate the location in the array where the local data or constants have been placed. Thus, the local data or constant references in the JAVA bytecode are changed to array references.

The present invention also provides an interpreter for use in conjunction with the condensed bytecode. The interpreter of the present invention can execute bytecode condensed in accordance with the compression method or system of the present invention.

These and other features and advantages of the invention will be appreciated from review of the following detailed description of the invention, along with the accompanying figures, in which like reference characters refer to like parts throughout.

DETAILED DESCRIPTION OF THE INVENTION

In accordance with the present invention, a system and method are provided for condensing computer code (referred to in this description as "bytecode") and generating a condensed bytecode. Such a system and method may be used in conjunction with various known computer languages and interpreters, including JAVA, various dialects of JAVA, such as the version available from the Microsoft Corporation, as well as other languages.

Figure 1:
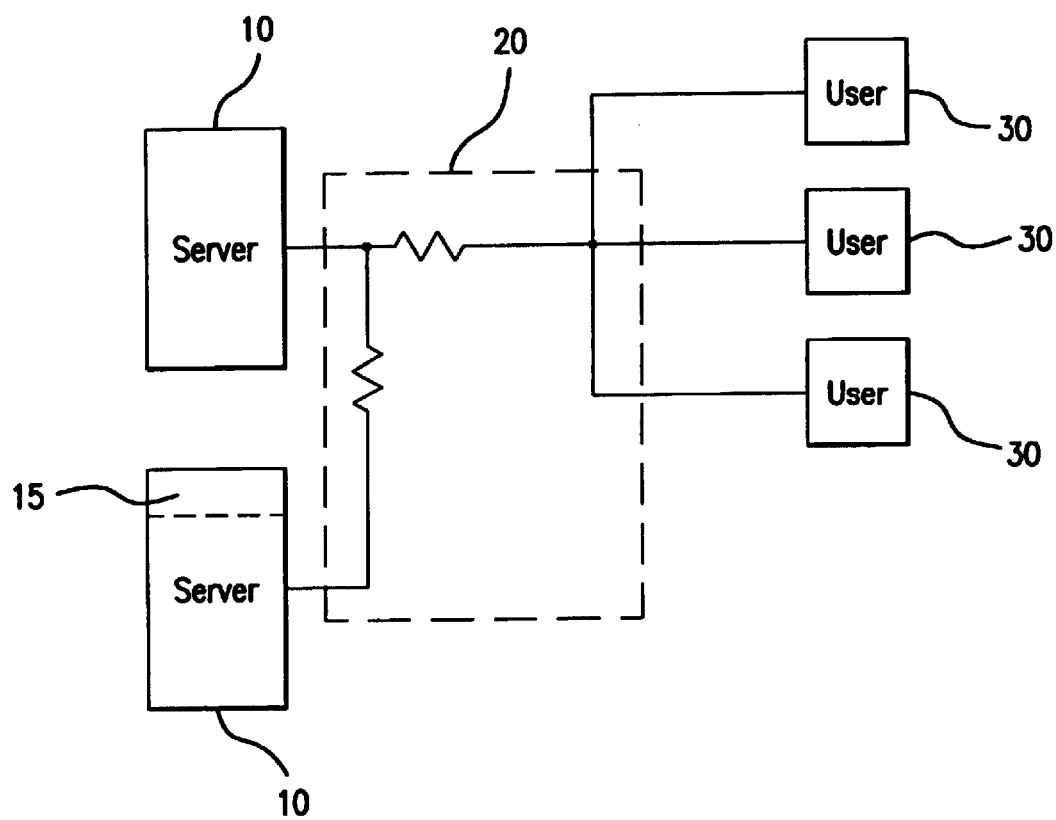
FIG. 1 is a block diagram illustrating an electronic communications network and server systems in accordance with the present invention.

Referring to FIG. 1, bytecode may be stored within a server system 10, which is connected via an electronic communication network 20 with user systems 30. In this description, "electronic communications network" (ECN) will be understood to include any computing, multimedia or video system in which a user can remotely access or receive transmissions of bytecode. For example, the ECN 20 may include cable transmission networks, telephone networks, an intranet, the Internet, or combinations thereof. It will be understood that an ECN as described herein may include a single server computer, such as a single bulletin board system.

Figure 2:
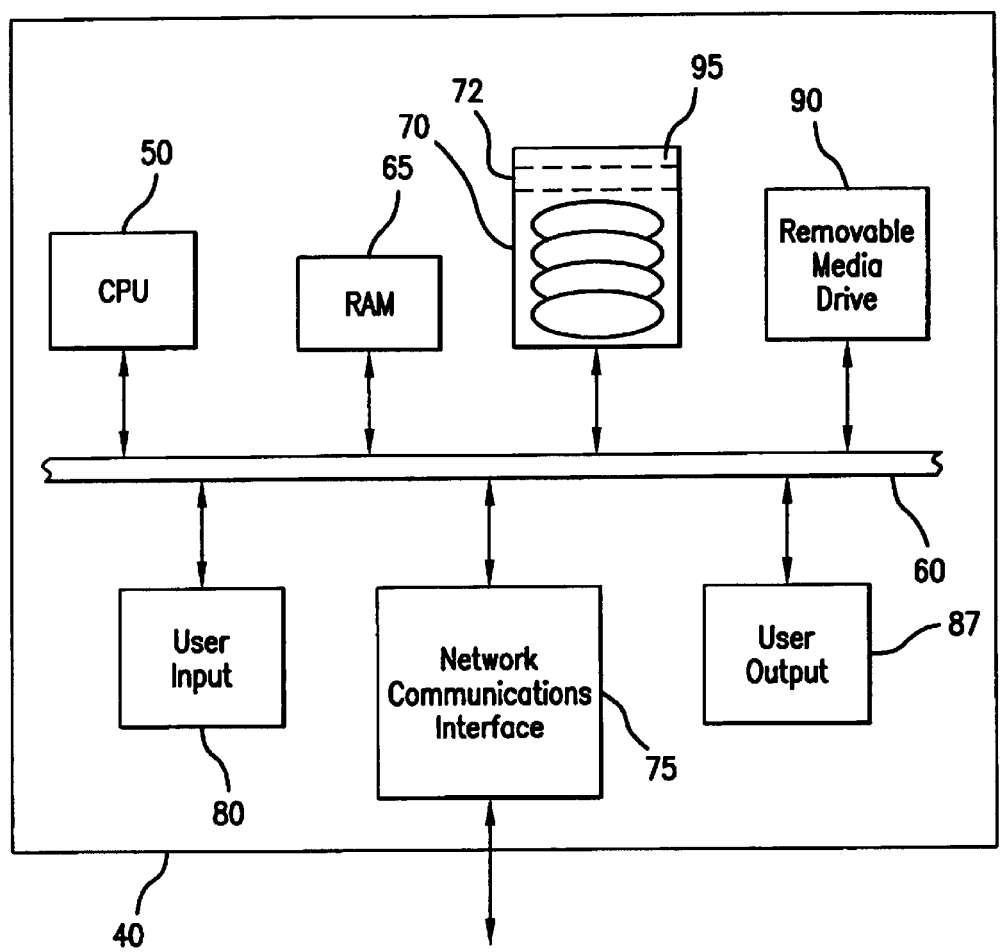
FIG. 2 is a system block diagram in accordance with the present invention.

As illustrated in FIG. 1, a plurality of server systems 10 may be connected to the ECN 20 and a plurality of user systems 30 may also be connected. The servers 10 may perform a number of functions including storing data and/or web page information and so on. In a preferred embodiment, at least one of the servers 10 has an associated memory 15 which stores bytecode and which can transmit the bytecode via the ECN 20 to a user system 30. As utilized in conjunction with the present invention, the server memory 15 stores a concentrated bytecode generated in accordance with the present invention. The concentrated bytecode may be transmitted via the ECN 20 to a user system 30. Preferably, the user system 30 contains an interpreter or other associated tool for receiving the concentrated bytecode and executing it. The concentrated bytecode generated in accordance with the present invention may be generated on a data processing system 40, as illustrated in FIG. 2. Typical data processing systems which may be used include personal computers, work stations, palm computers, personal digital assistants (PDAs) or even mainframe computers. Also, multiple systems coupled in a computer network, with data files shared among systems on the network, may be employed. Data processing systems can be used to practice the present invention utilizing a variety of operating systems (such as, for example, Windows, Windows NT, Windows 95, SunOS, OS/2 and Macintosh OS) and programming languages.

As illustrated in FIG. 2, a typical data processing system 40 includes a central processing unit (CPU) 50. The CPU 50 is optionally connected via a bus 60 to, among other things, a volatile memory 65 (e.g., a RAM), non-volatile memory 70 (such as disk drives, CD-ROMs, flash memory, or data tape), a network communications interface 75 (such as a modem, T1 line interface, ISDN modem or cable modem), a user input device or devices 80 (such as a keyboard and/or a pointing or point-and-click device such as a mouse, light pen, touch screen, touch pad), a user output device or devices 87 (such as a video display screen and/or an audio speaker), and a removable media drive 90 (such as a floppy disk drive, CD-ROM drive, PCMIA device, CD-WORM drive or data tape drive). The data processing system 40 can be a personal computer (PC).

The data processing system 40 may be a free standing system, providing bytecode concentrated in accordance with the present invention to a server 10 for transmission over the ECN 20. Alternatively, a server 10 may comprise the data processing system 40. Alternatively, the data processing system 40 may be in communication with user systems 30 via the ECN. In another embodiment, the data processing system 40 may receive bytecode, concentrate it on-the-fly in accordance with the present invention and then transmit it, such as to a server 10, or to another system via the ECN.

Although the method and system of the present invention can be used to great advantage within a networked system, as in the illustrated embodiment, it should be clear that the code condensing method and system of the present invention can also be used to advantage in non-networked computer systems.

The bytecode to be condensed in accordance with the present invention can be stored in the RAM 65, the non-volatile memory 70, or on the removable media 90. The bytecode to be condensed may also be transmitted on-the-fly to the data processing system 40, which in turn concentrates the bytecode on-the-fly and re-transmits the condensed bytecode. In the illustrated embodiment, the bytecode 72 to be concentrated is stored in the nonvolatile memory 70. In some applications, it may be desirable to store the bytecode 72 in RAM for increased access speed.

Various types of bytecode may be processed in accordance with the present invention. When a web page is received in a user system 30, the web page is displayed, for example, on the display device of the user system. Bytecode associated with the web page may cause, for example, a moving symbol to appear, or a sound to be generated, such as a voice saying "hello." More sophisticated bytecode may also be =generated.

Figure 3A:
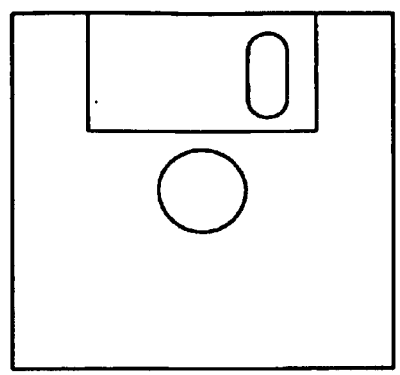
FIGS. 3A–3C are illustrations of various storage media upon which implementing code in accordance with the present invention can be stored.
Figure 3B:
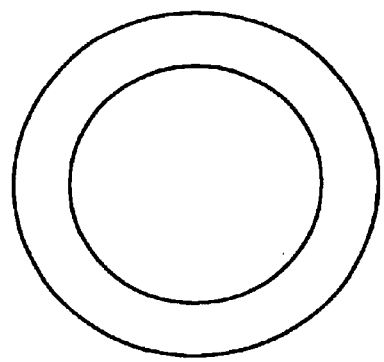
Figure 3C:
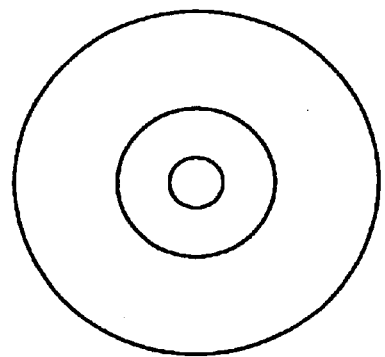

The data processing system 40 also executes and preferably stores condensing software 95 for condensing the bytecode 72 in accordance with the present invention. The condensing software 95 is illustrated in FIG. 2 as being stored in non-volatile memory 70. However, it should be understood that it can also be stored in other ways such as in RAM 65 or on removable media inserted in the removable media drive 90. Exemplary removable media for storing the condensing software 95 (which may be in any form, such as source code, compiled or binary versions) are illustrated in FIGS. 3A, 3B and 3C as floppy disks, magnetic tape and optical disks, respectively. In the preferred embodiment, the condensing software 95 is read into RAM 65 when it is to be executed.

To concentrate bytecode, the condensing software 95 is executed. The operation of a preferred embodiment is illustrated by flow diagrams shown in FIGS. 4–12 which will now be described.

The condensing software 95 is started in step 110, such as by clicking on an icon associated with the condensing software, or inputting a command string, or by selecting the condensing software from a pop-up or pull-down menu, or by any other triggering event. Preferably after start-up, one or more lists or other such data storage structures are initialized. The lists correspond to types of data items to be operated upon in the concentration method of the present invention. The data items operated upon may include any data format or structure included in the bytecode to be concentrated. For example, in the exemplary embodiment illustrated, the bytecode is written in accordance with the JAVA language (although any language base for the bytecode may be used.) In the exemplary embodiment, there are three types of data items which may be operated upon in the condensing operation: namely, classes, methods and fields. Although the embodiment described operates on all three types of data items, the method of the present invention can be readily modified to operate on any combination of these types of data items. Furthermore, there may be other types of data items that can be operated upon by a condensing method in accordance with the present invention. For example, the bytecode may be scanned for unused constants and any unused constants can be removed.

Figure 4:
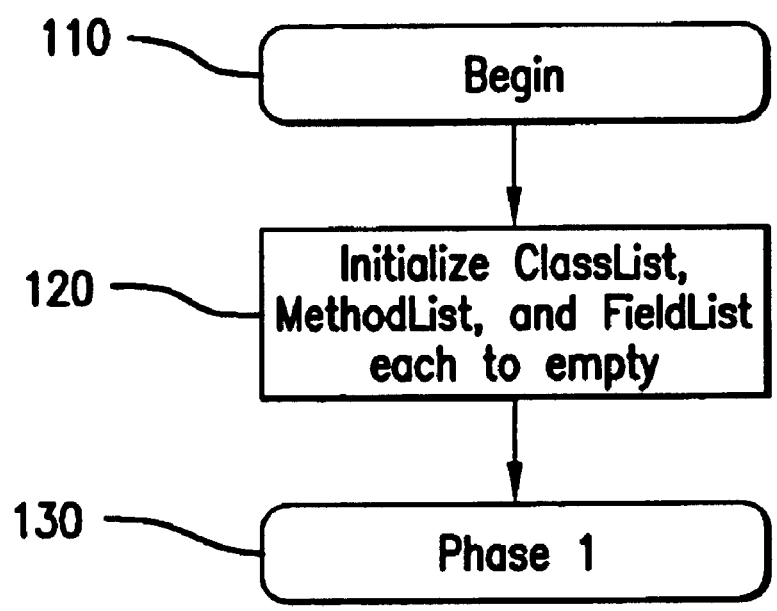
FIG. 4 is a flow diagram of a method of condensing software in accordance with the present invention.
Figure 5:
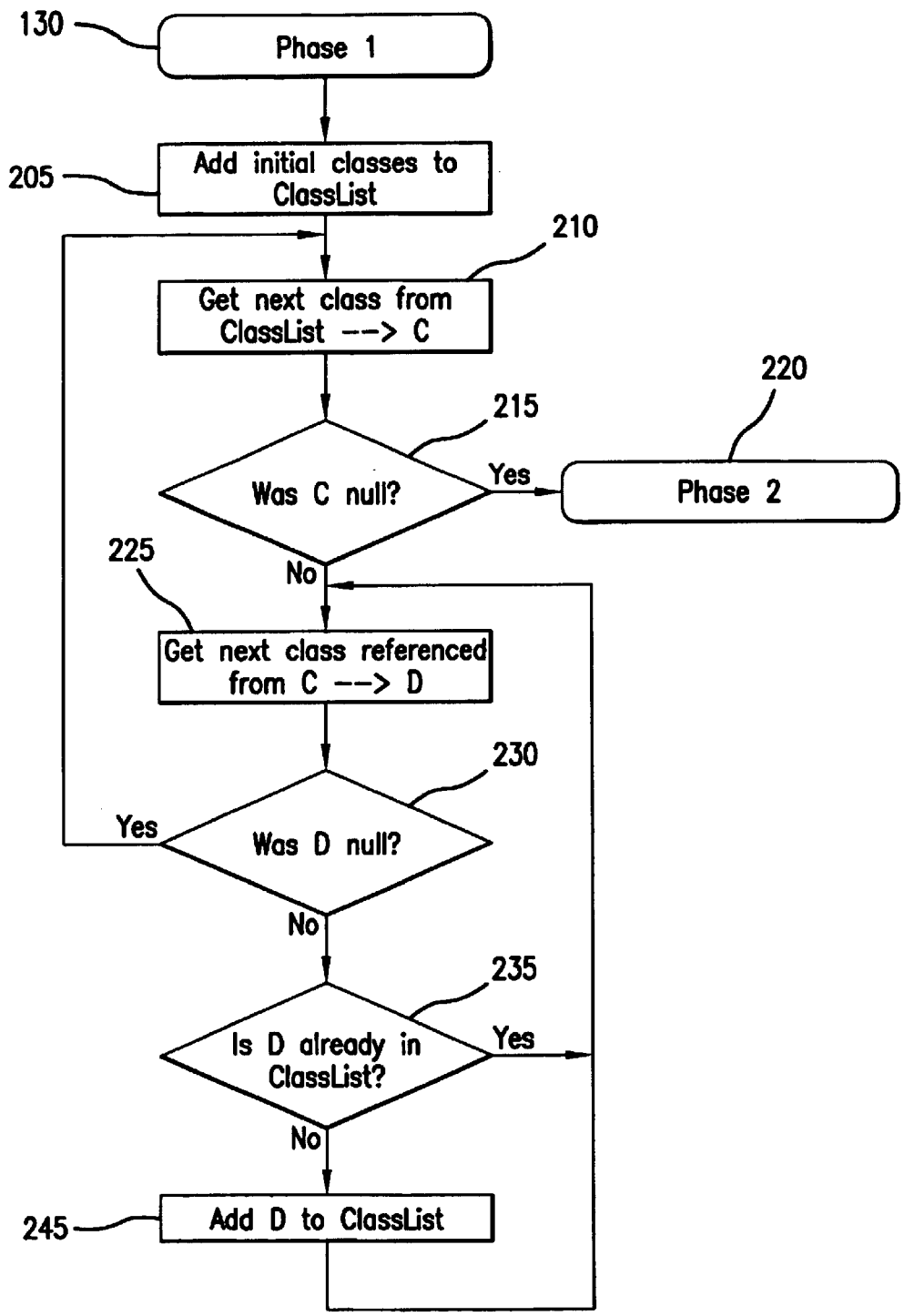
FIG. 5 is a flow diagram illustrating a first phase of a method of condensing software in accordance with the present invention.

As illustrated in FIG. 4, three lists corresponding respectively to classes, methods and fields are initialized in step 120 to some default state, such as empty. As discussed above, lists are used as exemplary data structures, but any suitable data structure may be used. The lists in the illustrated embodiment are referred to as "ClassList", "MethodList" and "FieldList".

As will be described, after the lists are initialized, the lists are filled with all of the associated data incorporated in the code structure 72 to be condensed. More specifically, the lists are filled with identifiers corresponding to the classes, methods and fields in the bytecode 72. An "identifier" will be understood to refer to the name of a unique class, method or field. The process of filling the lists may be performed in any order. Likewise, filling a particular list may be delayed until a later stage of processing when operation upon the data within that list is required.

The bytecode 72 to be condensed is received in the data processing system 40 and stored, for example, in the non-volatile memory 70 or RAM 65. Preferably, the bytecode 72 is stored in the RAM 65 when it is time to operate on it. The bytecode 72 may be received at any point in processing before the time it is required. For example, it may be received prior to or subsequent to the initialization step 120. A segment within the volatile memory 65 may preferably be allocated for performing the condensing operation.

The condensing method of the present invention can be divided into a series of phases. In the first phase, Phase 1, classes within the bytecode 72 are scanned and the ClassList is populated. The ClassList ultimately generated preferably contains a single notation of each of the classes that are referenced within the bytecode 72, either directly or indirectly. The bytecode 72 is scanned in order to generate the ClassList. This scanning operation commences with either an initial set of classes or only a single main class, depending on the bytecode 72 structure or on the programming language of the code to be condensed. In some bytecode or programming language versions only a single main class is used, while in others a set of initial classes are used. In some cases, there may be a set of fundamental classes (e.g., String, Number, Integer, Float) and error and exception classes (e.g., ArrayOutOfBounds, MethodNotFound) that the system knows will be required at some point and as such are always included in the ClassList and thus condensed.

In operation, starting with the main class or initial class, a listing (i.e., the ClassList) is maintained of all the classes that are referenced in the bytecode 72. Each of these classes is then scanned to determine if the class contains (or references) any additional classes that are not already listed in the ClassList. Any such additional classes are added to the ClassList and scanned as well, until a listing of all of the classes contained within the bytecode 72 is completed. Any procedure for scanning the bytecode and creating a complete list of classes may be used. In the embodiment illustrated in FIG. 5, the condensing process of the present invention continues from FIG. 4, as indicated by step 130. In step 205, any initial classes, such as the fundamental classes discussed above, are added to the ClassList. Alternatively, only a single "main" class may be added to the list. A series of steps 210–245 are undertaken to add any additional classes to the ClassList until all classes referenced in the bytecode 72, either directly or indirectly are included in the ClassList. Steps 210–245 will now be described in greater detail.

In the illustrated embodiment, at step 210, a first class is retrieved from the ClassList and a variable C is filled with the name or other designation corresponding to the first class. In successive iterations of step 210, variable C will be assigned successive classes listed in the ClassList and each class will be processed in accordance with the steps which follow. Variable C thereby indicates the class which is currently being processed, which class will be referred to as "class C". Upon reaching the end of the ClassList, the variable C will receive in step 210 an "end-of-list" value (e.g., a null value) indicating that there are no more classes in the ClassList to be processed. If it is determined in step 215 that variable C has received a null value in step 210, processing continues to the next phase, Phase 2, as indicated by step 220. If C is not null, thereby indicating that there are more classes to be processed, operation continues with step 225.

In step 225, it is determined whether class C contains any references to other classes. In step 225, the first of any such class referenced is assigned to a variable D. If there are more classes referenced by class C, operation will loop back to step 225 for each such class so that variable D indicates the referenced class currently being processed. The variable D will receive a null value if there are no more referenced classes to be processed. If it is determined in step 230 that the variable D has a null value, operation loops back to step 210 in which the next class in the ClassList is selected and assigned to the variable C.

If it is determined in step 230 that the variable D does not have a null value, step 235 is performed in which the variable D is compared against the ClassList to determine if the class indicated by the variable D is already in the ClassList. If the class indicated by the variable D is already in the ClassList, then processing returns to step 225, in which the next class referenced by class C is assigned to the variable D. If the class indicated by the variable D is not in the ClassList, processing continues with step 245 in which the class indicated by the variable D is added to the ClassList. Again, processing loops back to step 225 in which the next class referenced by class C is assigned to the variable D. This processing of classes referenced by the class C continues until all such referenced classes are processed and added to the ClassList, if required.

Once all of the classes referenced by class C are processed in accordance with the steps described above, the variable D will receive a null value in step 225 and step 230 will direct operation back to step 210 in which the next class in the ClassList is assigned to the variable C. Then, as for the previous class in the ClassList, all of the classes referenced by the currently processed class (class C) are processed in accordance with steps 225 through 245. This processing of classes in the ClassList continues until all classes in the ClassList have been processed. As described above, after the last class in the ClassList has been processed, variable C is assigned a null value or other such "end-of-list" designation. This null designation is detected in step 215 and processing continues with Phase 2, as indicated in step 220.

In Phase 2, the MethodList and FieldList are populated so as to list all method and field references, respectively, within the bytecode to be condensed. The MethodList ultimately generated preferably contains a single notation for each of the methods contained within the bytecode 72 and the FieldList ultimately generated contains a single notation for each of the fields contained therein. Any series of processing steps to scan the bytecode 72 and create these lists can be used.

Figure 6:
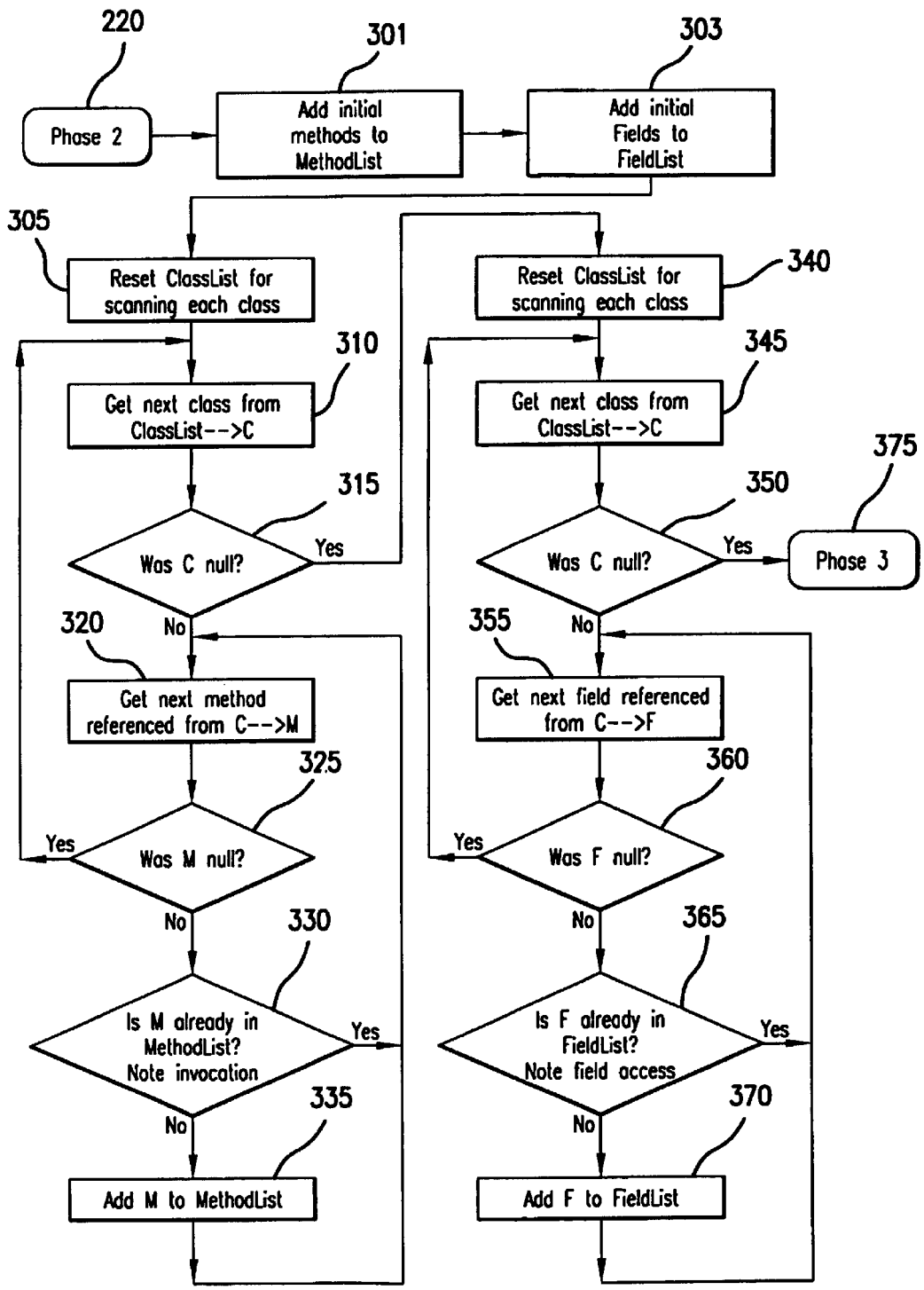
FIG. 6 is a flow diagram illustrating a second phase of a method of condensing software in accordance with the present invention.

Phase 2 will now be described, with reference to FIG. 6. In the embodiment illustrated in FIG. 6, the code condensing process of the present invention continues from FIG. 5, as indicated by step 220, labeled "Phase 2."

Initialization of the MethodList and FieldList takes place in steps 301 and 303. Any initial methods (e.g., main( ), init( ) and classinit( ), which are required by all JAVA applications) and any initial fields are added to the MethodList and FieldList, respectively, in steps 301 and 303, respectively. These initialization steps may be performed at any point in the process prior to the respective list population steps. For example, the MethodList should be initialized prior to the MethodList processing steps commencing with step 320 (discussed below), whereas the FieldList should be initialized prior to the FieldList processing steps commencing with step 355 (discussed below). In an exemplary alternative embodiment (not shown), the MethodList and FieldList can be initialized when the ClassList is initialized i.e., steps 301 and 303 can be performed at approximately the same time as step 205. In another alternative embodiment (not shown), step 301 can be performed immediately preceding step 320 and step 303 can be performed immediately preceding step 355.

Following initialization of the MethodList in step 301, a series of steps (described below) are undertaken to add any additional methods to the MethodList so that all methods referenced in the bytecode to be condensed are included in the MethodList. Likewise, following initialization of the FieldList in step 303, a series of steps (described below) are undertaken to add any additional fields to the FieldList until all fields referenced in the bytecode to be condensed are included in the FieldList.

After the initialization steps 301 and 303, operation proceeds to step 305 in which a ClassList pointer is reset to point to the beginning of the ClassList. In step 310, a first class is retrieved from the ClassList and assigned to a variable C. (For classes following the first class in the ClassList, the "next" class is selected in subsequent executions of step 310.) In step 315, a determination is made as to whether the variable C has been assigned a null value. (After the last class has been processed, as described below, operation loops back to step 310 in which the variable C receives a null value.) If it is determined in step 315 that variable C has a null value, operation branches to step 340, described below. If variable C is not set to a null value, operation proceeds to step 320.

For every class in the ClassList, the bytecode is scanned and the method invocations in each class are noted. The illustrated embodiment provides a method for accomplishing this. In step 320, the first method in the class indicated by the variable C (which class will be referred to as "class C") is retrieved from the MethodList and assigned to a variable M. (For subsequent methods after the first method in class C, the "next" method is selected in step 320.) In step 325, a determination is made as to whether the variable M has been assigned a null value. (After the last method in class C has been processed, as described below, operation loops back to step 320 in which the variable M receives a null value or any such appropriate "end-of-list" designation.) If it is determined in step 325 that variable M has a null value, operation loops back to step 310 to process the next class in the ClassList. If the variable M is not set to a null value, operation proceeds to step 330.

In step 330, the method indicated by the variable M (i.e., "method M") is compared against the MethodList to determine if method M is already contained in the MethodList. If it is determined in step 330 that method M is already in the MethodList, then operation loops back to step 320, in which the next method referenced in class C is assigned to the variable M. If it is determined in step 330 that method M is not in the MethodList, processing continues to step 335 in which method M is added to the MethodList. Operation loops back to step 320 in which the next method in class C is assigned to the variable M.

Optionally, an additional step (not shown) may be included between steps 325 and 330, in which the location or other useful identifying characteristic of method M is noted. In this step, pertinent information that is useful for later (post-concentration) processing, such as the "attributes" of the method, its location and size (i.e., the number of bytes in the bytecode which defines the method's operation), the exceptions the method might raise as error conditions, etc., can be optionally stored in an array, or can be stored in the MethodList with the entry for the method M.

The processing of methods contained within class C continues until all such methods within the class are processed, added to the MethodList, if required, and attributes noted, as required. When all of the methods referenced in class C have been processed, the variable M receives a null value in step 320, as discussed above, and processing continues to step 310 in which the next class in the ClassList is selected. This processing of each method in each class continues until all of the classes are processed and the variable C receives a null value in step 310. At that point, step 315 directs operation to step 340, as discussed above.

It should be appreciated that steps 310–335 may be performed in conjunction with the class processing steps described earlier, i.e., with steps 210–245. In such an embodiment, the MethodList and ClassList are populated concurrently, thereby eliminating an additional pass through the ClassList for processing the MethodList.

Once the bytecode has been scanned for classes and methods, as described above, the bytecode is scanned for fields, beginning with step 340. For every class in the ClassList, and for every method in each class, the bytecode is scanned and the field accesses for each field in every method and class are noted. The illustrated embodiment provides one technique for accomplishing this. In the embodiment shown in FIG. 6, in step 340, a pointer to the ClassList is reset to point to the first class in the ClassList. In step 345, the first class is retrieved from the ClassList and assigned to a variable C. (For subsequent classes, after the first class, the "next" class is selected in subsequent executions of step 345.) In step 350, a determination is made as to whether the last class in the ClassList has been processed. If so, the variable C will be assigned a null value in step 345. If in step 350 it is determined that the variable C has a null value, operation branches to step 375, commencing Phase 3, described below. If in step 350 it is determined that variable C is not set to a null value, operation proceeds to step 355. In step 355, the first field in the class indicated by the variable C (i.e., class C) is retrieved from the FieldList and assigned to a variable F. (For subsequent fields in class C, the "next" field is selected in step 355.) In step 360, a determination is made as to whether the variable F has been assigned a null value. In other words, when the last field in class C has been processed, variable F is set to a null value or other designated value in step 355. If it is determined in step 360 that variable F is not set to a null value, operation proceeds to step 365.

In step 365, the field indicated by the variable F (i.e., field F) is compared against the FieldList to determine if field F is already in the FieldList. If it is determined in step 365 that the field F is already in the FieldList, then operation loops back to step 355, in which the next field referenced in class C is assigned to variable F. If, however, it is determined in step 365 that field F is not in the FieldList, operation continues with step 370 in which field F is added to the FieldList. Operation then returns to step 355 in which the next field in class C is assigned to the variable F.

Optionally, an additional step (not shown) may be included between steps 360 and 365 in which the location or other identifying characteristic of the field F is noted. In this step, attributes of the field such as the length, position (offset within an object), whether it is static or instance, and type of field can be stored for use in later processing. This information can be stored either in an ancillary and parallel array, or in the FieldList along with the entry for the Field F.

The processing of fields contained in class C continues until all such fields within the class are processed, added to the FieldList, if required, and attributes noted as required. When all of the fields have been processed, variable F is assigned a null value in step 355, as discussed above, and operation loops back at step 360 to step 345, in which the next class in the ClassList is assigned to the variable C. This processing of each field in each class continues until all of the classes are processed. At that point, the variable C receives a null value in step 345 and step 350 operates to direct operation to step 375.

It should be noted that two or more of the list processing procedures described above can be combined and performed concurrently. For example, the class scanning phases involving steps 210, 310 and 345 can be combined. Also, it should be appreciated that field processing steps 355–370 may be performed in conjunction with the class processing steps described earlier (steps 210–245), or in conjunction with the processing of methods in each class (steps 305–335). In such an embodiment, in which the field and class processing are performed together, an additional pass through the ClassList for processing the FieldList is thus avoided.

Figure 7:
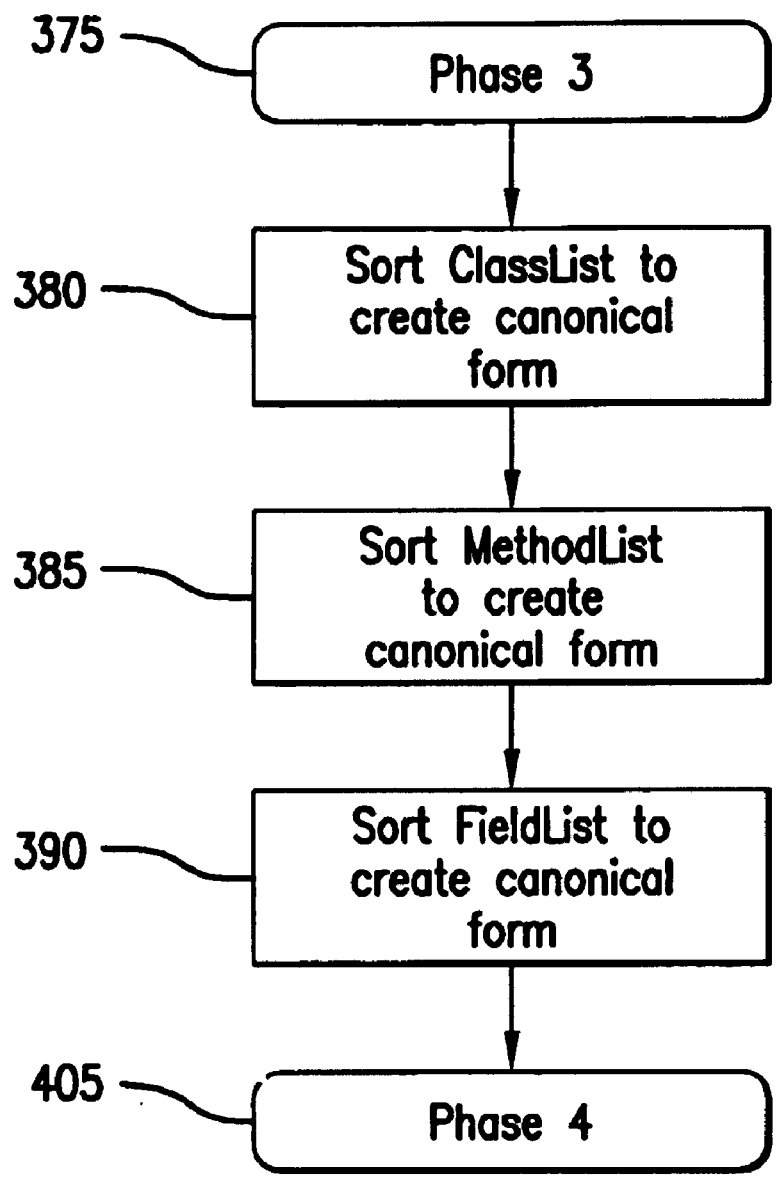
FIG. 7 is a flow diagram illustrating a third phase of a method of condensing software in accordance with the present invention.
Figure 8:
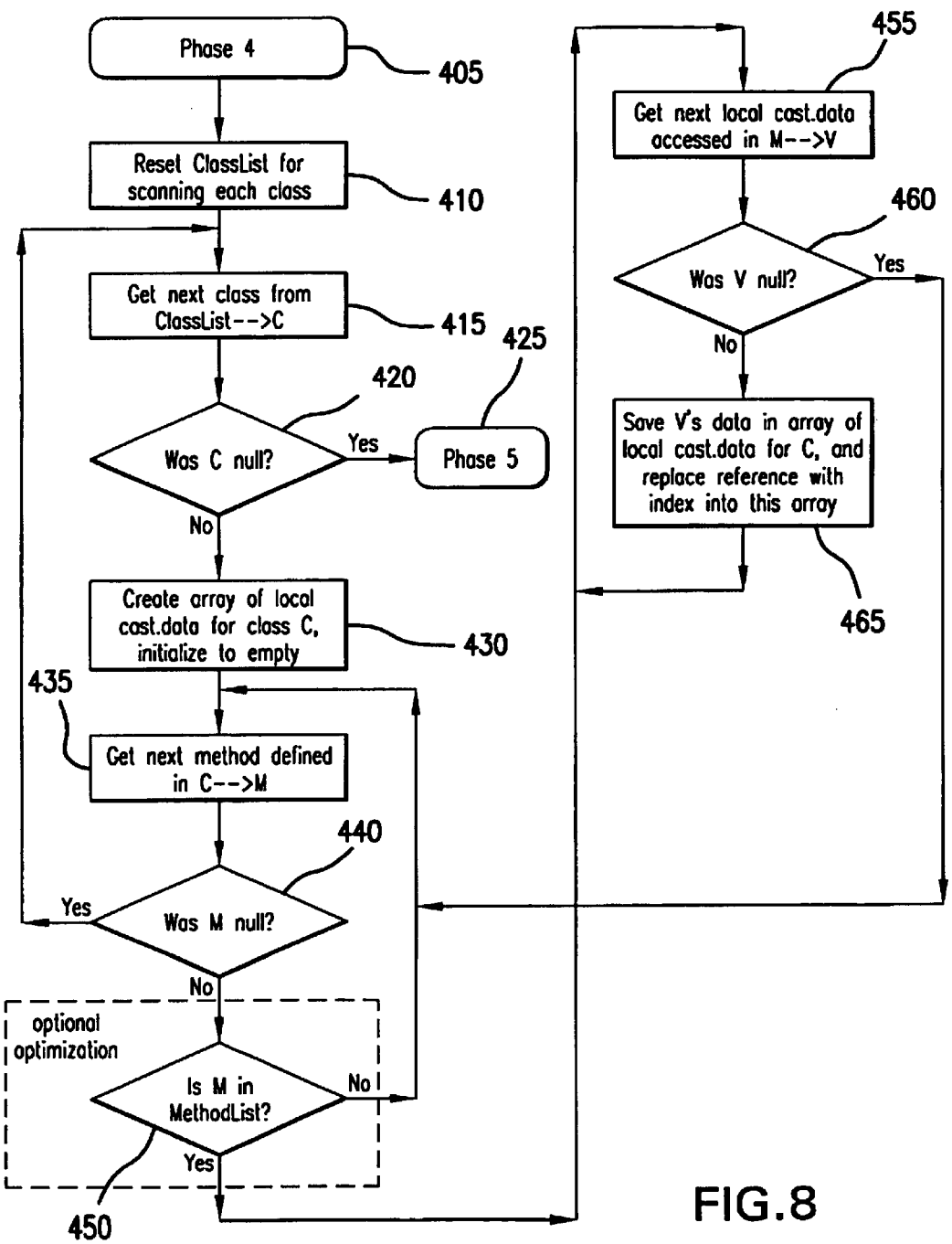
FIG. 8 is a flow diagram illustrating a fourth phase of a method of condensing software in accordance with the present invention.

In the illustrated embodiment, the lists created by the above-described process, ClassList, MethodList and FieldList, are then sorted in a third phase, Phase 3, shown in FIG. 7. It should be noted that any form of sorting may be performed, such as alphabetical, reverse alphabetical, time-based or numerical. It should also be noted that sorting may be performed at any time. In an alternative embodiment (not shown), sorting is performed as the lists are created. In another alternative embodiment (not shown), the sorting of a list is performed following completion of the list. In the exemplary embodiment shown in FIG. 7, sorting is performed after all of the lists have been created.

Phase 3 commences with step 375. In phase 3, the ClassList, MethodList and FieldList are sorted to put them into canonical list form, in which each class, method and field, respectively, is assigned a unique index reference. Any form of list or index may be created as long as the respective identifiers are included in the list and each is preferably associated with a unique index reference. Each index reference is typically an integer which corresponds to the position of the corresponding identifier within one of the canonical lists, although the index references can be of virtually any form, such as strings.

The ClassList is sorted in step 380 so that a canonical list of classes is generated. In step 385, a canonical list of methods is generated, including every method invoked from any class. In step 390, a canonical list of fields is generated, including every field accessed from any class.

Once the lists are sorted, operation proceeds to Phase 4, step 405. In Phase 4, all local constant data referenced by each method of each class of the bytecode to be condensed are noted. Local data are constants used by methods and can be numeric (e.g., integers, floating point numbers) or can be strings. The noted data for each class are preferably stored in an array for each class, noting the location in the array where the data are saved. The data locations, i.e., index values, in the array are inserted in the methods, thereby replacing the local data references in the bytecode methods with index values. This procedure will now be described in greater detail with reference to FIG. 8 which illustrates an embodiment of a procedure for collecting accessed local data for every class of the bytecode to be condensed.

In step 410, a pointer to the ClassList is reset to point to the first class in the list. This is the beginning of a processing loop in which all classes in the ClassList are processed. In step 415, the "next" class in the ClassList (i.e., the class which the ClassList pointer currently points to) is assigned to a variable C. If it is determined in step 420 that the variable C has been assigned a null value, thereby indicating that all classes in the ClassList have been processed, operation branches to Phase 5, step 425, described below. If variable C is not null, operation proceeds to step 430.

In step 430, an array of the local constant data for the class indicated by the variable C (i.e., class C) is created. This array is initialized as empty but is eventually populated with the values of the local constant data for class C, as described below. Then, in step 435, a processing loop is commenced for each method defined in class C. In step 435, the first method in class C is assigned to a variable M (and subsequent methods in class C are assigned to the variable M in subsequent executions of step 435). If the variable M is null, thereby indicating that the last method defined in class C has been processed, operation loops back to step 415. If the variable M is not null, operation proceeds to an optional optimization step 450 in which it is determined whether the method indicated by the variable M (i.e., method M) is in the MethodList. If it is determined in step 450 that method M is not in the MethodList, operation loops back to step 435. Since the MethodList is a list of identifiers of all methods referenced or invoked in the bytecode 72, if method M is not in the MethodList, this is an indication that method M is unused, i.e., that it is never referenced in the bytecode 72. In that case, method M can be skipped and any local constant data used by method M can be ignored. If method M is in the MethodList, processing continues to step 455. (Without step 450, operation proceeds directly to step 455.)

In step 455, a processing loop is commenced for processing local constants accessed by method M. Starting with the first such local constant, each local constant referenced by method M is successively assigned to a variable V with each iteration of step 455. In step 460, a determination is made as to whether the last local constant referenced by method M has been processed, i.e., whether variable V has been assigned a null value. If variable V is null, operation returns to step 435 in which the next method is assigned to variable M. If it is determined in step 460, however, that variable V is not null, operation continues to step 465 in which the data corresponding to the local constant indicated by V is saved in the array of local constant data (created in step 430) for class C. The array of local constant data is preferably indexed and the index value or location corresponding to the saved local constant in the array is placed in the bytecode in place of the local constant. In other words, each reference to a local constant in method M, in class C, is replaced with an index reference corresponding to the local constant.

After step 465, operation loops back to step 455, in which the next local constant in method M (in class C), is selected. As described above, this processing loop continues until the last local constant in method M is processed in accordance with the present invention.

After the last class in the ClassList has been processed and the variable C is assigned a null value in step 415, operation branches to Phase 5, step 425, which will now be described in detail with reference to FIGS. 9 and 10.

Bytecode updating and condensing is performed for every class in the ClassList and for every method in every class. For each class, the bytecode is scanned and the class is replaced with an index into the canonical ClassList, created in step 380 (FIG. 7). In other words, each of the class references preferably is replaced with an index indicating a location within the canonical ClassList. For each method, the bytecode is scanned and the method reference is replaced with an index into the canonical MethodList, created in step 385 (FIG. 7). In other words, each of the method references preferably is replaced with an index indicating a location within the canonical MethodList. Likewise, for every field reference in every method, in every class, the field reference in the bytecode is replaced with an index into the canonical FieldList, created in step 390 (FIG. 7). In other words, each of the field references preferably is replaced with an index indicating a location within the canonical FieldList. It should be noted that it is preferred that the class, method and field references be replaced. However, in alternative embodiments, one or two of the class, field and method references may be replaced in this manner.

Figure 9:
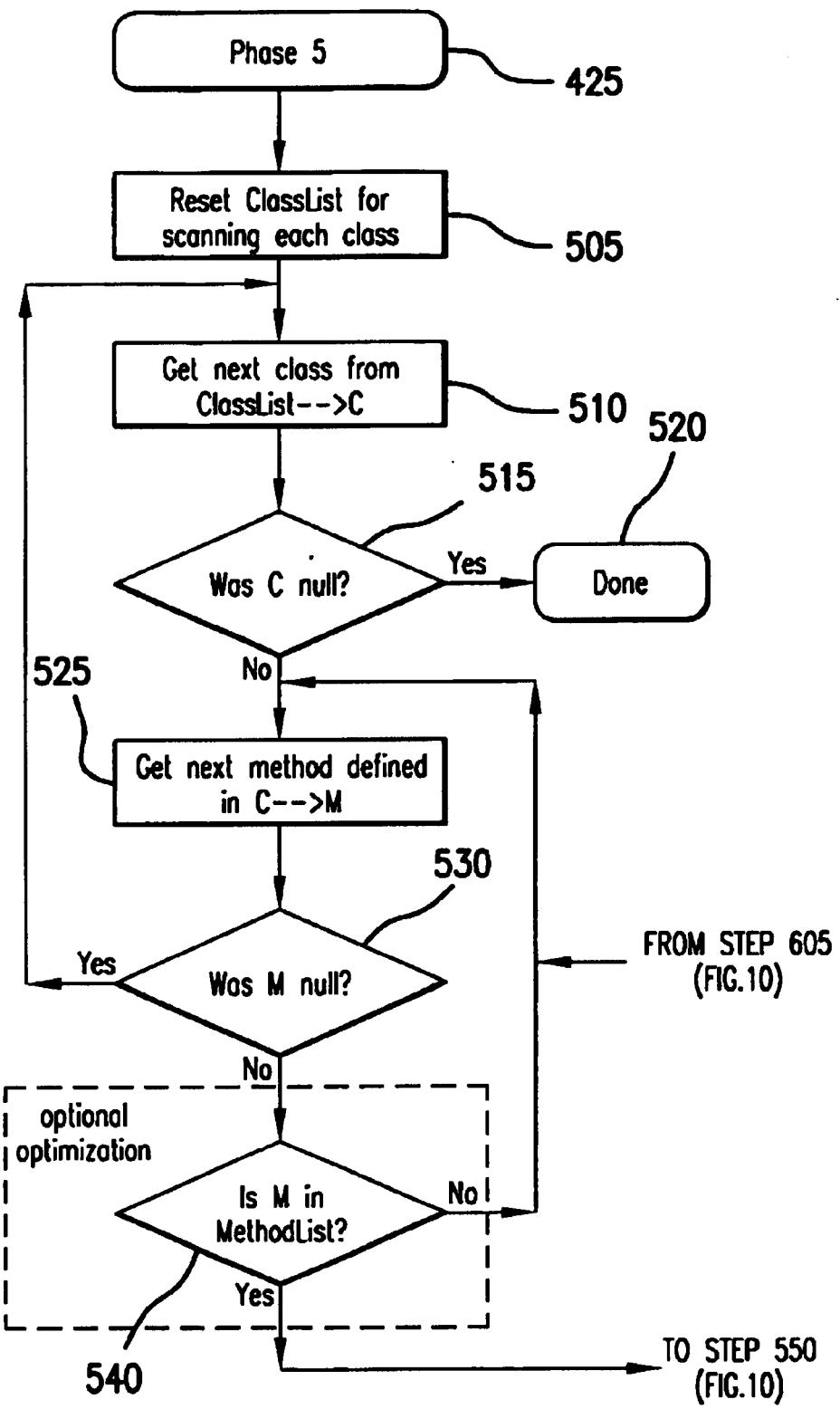
FIG. 9 is a flow diagram illustrating a first portion of a fifth phase of a method of condensing software in accordance with the present invention.
Figure 10:
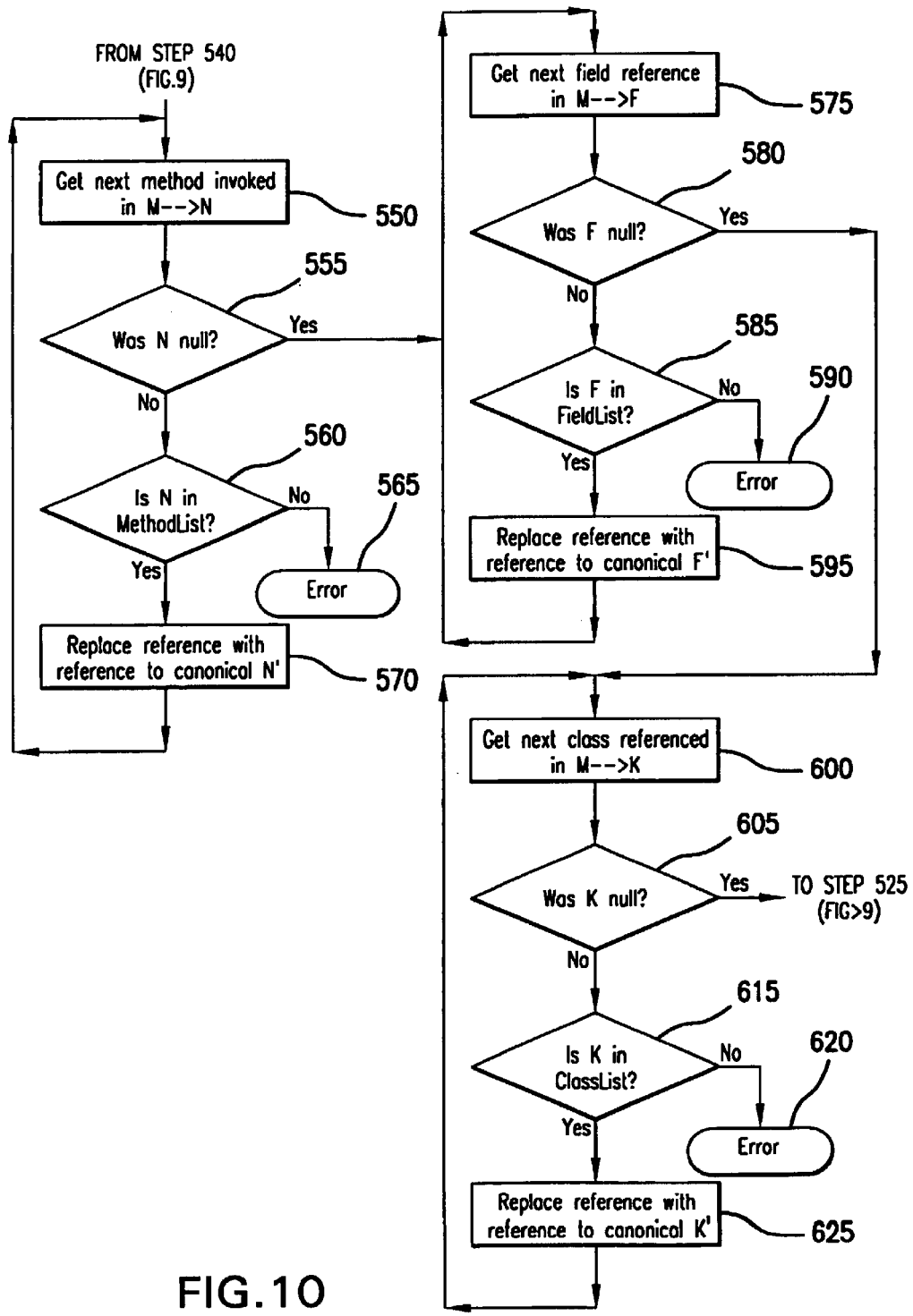
FIG. 10 is a flow diagram illustrating a second portion of a fifth phase of a method of condensing software in accordance with the present invention.

In the illustrated embodiment, the bytecode updating is performed in Phase 5, which begins as indicated with step 425 in FIG. 9. In step 505, a pointer to the ClassList is reset to an initial location to begin a processing loop in which all classes in the ClassList are processed. The "next" class to be processed (i.e., the class currently pointed to by the ClassList pointer) is selected from the ClassList in step 510 and assigned to a variable C, which class will be referred to as class C. If the last class has been processed, the variable C will receive a null value in step 510. If it is determined in step 515 that the variable C has a null value, operation branches to step 520, labeled "Done", indicating that the condensing process of the exemplary embodiment has been completed. When the condensing process has been completed, all fields in all methods, all methods in all classes and all classes are preferably replaced with index references.

If it is determined in step 515 that variable C is not null, operation continues to step 525, commencing a processing loop for each method defined in class C. In step 525, the next method to be processed (starting with the first method) in class C is assigned to the variable M, which method will be referred to as method M. If it is determined in step 530 that the variable M is null, thereby indicating that all methods defined in class C have been processed, operation loops back to step 510. Otherwise, if the variable M is not null, operation continues with an optional optimization step 540, in which it is determined whether method M is in the MethodList. If method M is not in the MethodList, i.e., if method M is never referenced or invoked, operation loops back to step 525 with no further processing carried out for method M. If, however, it is determined in step 540 that method M is in the MethodList, operation continues to step 550, described below with reference to FIG. 10. (Without optional step 540, operation proceeds from step 530 directly to step 550.)

Step 550 commences a loop in which all methods invoked within method M are reviewed. This procedure also handles bytecode having multiple levels of method invocations and is repeated as required to process all invoked methods.

In the loop commencing with step 550, the first method invoked in method M is assigned to a variable N, which invoked method will be referred to as method N. (Subsequent methods invoked in method M are assigned to the variable N in subsequent executions of step 550.) If it is determined in step 555 that the variable N has been assigned a null value, thereby indicating that all methods invoked in method M have been processed, operation proceeds to step 575, in which the processing of fields is carried out, as described more fully below. Otherwise, if it is determined in step 555 that the variable N is not null, operation continues with step 560, where it is determined whether method N is in the MethodList. If method N is not in the MethodList, an error condition is indicated in step 565. If method N is in the MethodList, processing continues to step 570. In step 570, the reference in the bytecode to method N is replaced with an index reference N', corresponding to the canonical index of the method N in the MethodList. Processing then returns to the beginning of the loop in step 550 and the next method invoked in method M is assigned to the variable N. This loop continues until a null value is assigned to the variable N and step 555 directs operation to step 575.

Step 575 is the first step of a field processing procedure in which all fields referenced in the method M are processed. In step 575, the first field referenced in method M is assigned to a variable F. (Subsequent fields referenced in method M are assigned to the variable F in subsequent executions of step 575.) If it is determined in step 580 that the variable F has a null value, thereby indicating that all fields referenced in the method M have been processed, operation proceeds to step 600. Otherwise, if the variable F is not null, processing continues with step 585, where it is determined if the field indicated by the variable F, which field will be referred to as field F, is in the FieldList. If field F is not in the FieldList, an error is returned, as indicated in step 590. If field F is in the FieldList, operation proceeds to step 595. In step 595, the reference in the bytecode to field F is replaced with an index reference F' corresponding to the canonical field index of the field F in the FieldList. Operation then returns to step 575 and the next field referenced in method M is assigned to the variable F. The loop comprising steps 575–595 is repeated until it is determined in step 580 that the variable F has a null value, in which case operation proceeds to step 600.

Step 600 is the first step of a class processing procedure in which all classes referenced in method M are processed. In step 600, the first class referenced in method M is assigned to a variable K. In subsequent executions of step 600, subsequent classes referenced in method M are assigned to the variable K. If it is determined in step 605 that the variable K has a null value, thereby indicating that all classes referenced in method M have been processed, operation loops back to step 525 (FIG. 9). Otherwise, if the variable K is not null, operation proceeds to step 615, where it is determined if the class associated with variable K, which class is referred to as class K, is in the ClassList. If class K is not in the ClassList, an error is returned, as indicated in step 620. If class K is in the ClassList, processing continues to step 625. In step 625, the reference in the bytecode to class K is replaced with an index reference K' corresponding to the canonical index of the class K in the ClassList. Processing then returns to step 600 and the next class referenced in method M is assigned to the variable K. The processing loop 600–625 continues until a null value is assigned to the variable K and step 605 directs operation to step 525 (FIG. 9).

As described above, step 525 selects the next method defined in class C for processing. All methods in class C are processed in this manner. After the last method in class C has been processed, variable M is assigned a null value and step 530 directs operation back to step 510. As described above, step 510 selects the next class in the ClassList for processing. All the classes in the ClassList are processed in this manner. After the last class in the ClassList has been processed, variable C is assigned a null value and processing is completed, as indicated in step 520.

In accordance with the present invention, all of the fields, methods and classes in the bytecode 72 are preferably replaced with index values of the canonical lists that are created, as described above. Additionally, all local constants are replaced by indexes into local constant arrays created for each class, as described above. In alternative embodiments, some subset of classes, methods, field and local constants in the bytecode may be replaced with index values. For example, in one embodiment, the fields and methods are replaced with index references, but not the classes. In another embodiment, for example, the classes and fields are replaced with index references, but not the methods.

Furthermore, additional optimization can be performed in which the bytecode is scanned for uncalled or unused methods and/or fields. These are discarded by skipping them when reconstructing the bytecode file, for example in connection with creating the condensed bytecode file containing index references, as described above. Moreover, local variables in methods that are not called are also not used and can thus be discarded.

An illustration of the operation of an embodiment of the present invention is included in Appendix 1. One example of a JAVA code class (GraphApplet.class) is shown, along with a list (section 1A) of constants in the class file. This is followed by the methods defined in the class. Method double__f(double), which returns a double, and method void__paint(java.awt.Graphics) are shown (in section 1B). Three sorted dictionaries are then illustrated (in section 2): classes, methods and fields. This is followed (in section 3) by a concentrated representation of the class, including an array of accessed local constants and concentrated code.

Once the bytecode 72 has been condensed in accordance with the present invention, it can be transmitted to a user system. The user system can execute the bytecode 72 using a method in accordance with the present invention which will now be described with reference to FIGS. 11 and 12.

Figure 11:
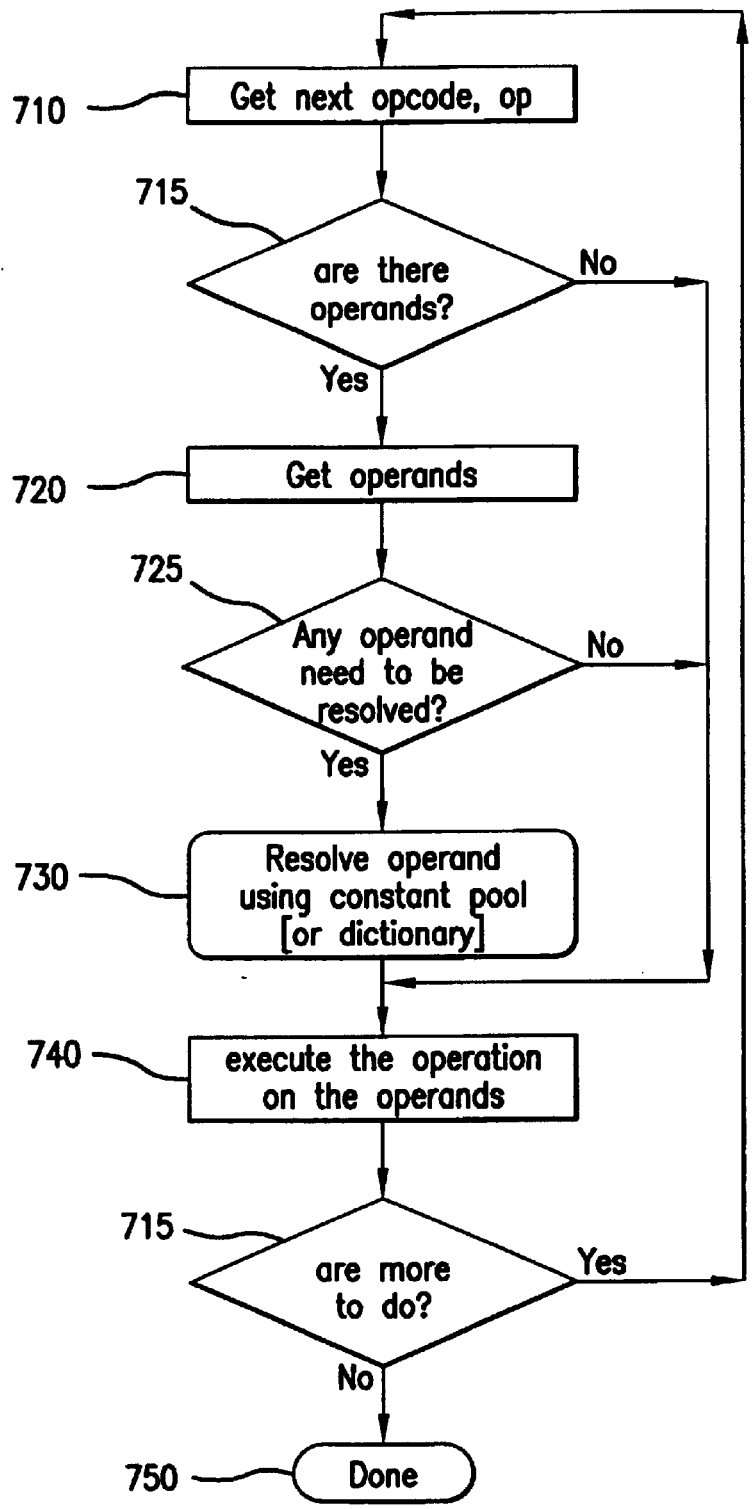
FIG. 11 is a flow diagram of an exemplary method of executing bytecode condensed in accordance with the present invention.

Each instruction in the bytecode 72 consists of an opcode specifying the operation to be performed, followed by zero or more operands supplying arguments or data to be used by the operation. As shown in FIG. 11, the first step in the execution of an instruction is to fetch the opcode, step 710.

At step 715, it is determined whether the opcode fetched has any operands associated with it. If not, operation branches forward to step 740 in which the operation specified by the opcode is executed.

If there are operands, operation proceeds to step 720 in which the operands are fetched from the bytecode. Operation then proceeds to step 725 in which it is determined whether any of the fetched operands need to be resolved. Generally, an operand will need to be resolved if it is not a literal constant. Opcodes that refer to classes, methods or fields have operands that need to be resolved. The type of operand is implied by the opcode. For example, the "putfield" operation takes a value off a stack and moves it into the field of an object. The operand which immediately follows the "putfield" operator in the bytecode is a field identifier which specifies the field. In bytecode condensed in accordance with the present invention, the operand will be an index into the canonical FieldList.

If no operand needs to be resolved, operation proceeds to step 740 in which the operation specified by the opcode is executed using the operands. If there are operands to be resolved, operation proceeds to step 730 in which the operands are resolved. This procedure will be described in greater detail below with reference to FIG. 12. Once the operands have been resolved, operation continues to step 740 in which the operation specified by the opcode is carried out with the resolved operands.

Once the current instruction is executed, it is determined in step 745 whether there are more instructions in the bytecode 72 to be executed. If there are, operation loops back to step 710 in which the next opcode to be executed is fetched. If there are no more instructions to be executed, operation terminates at step 750.

Figure 12:
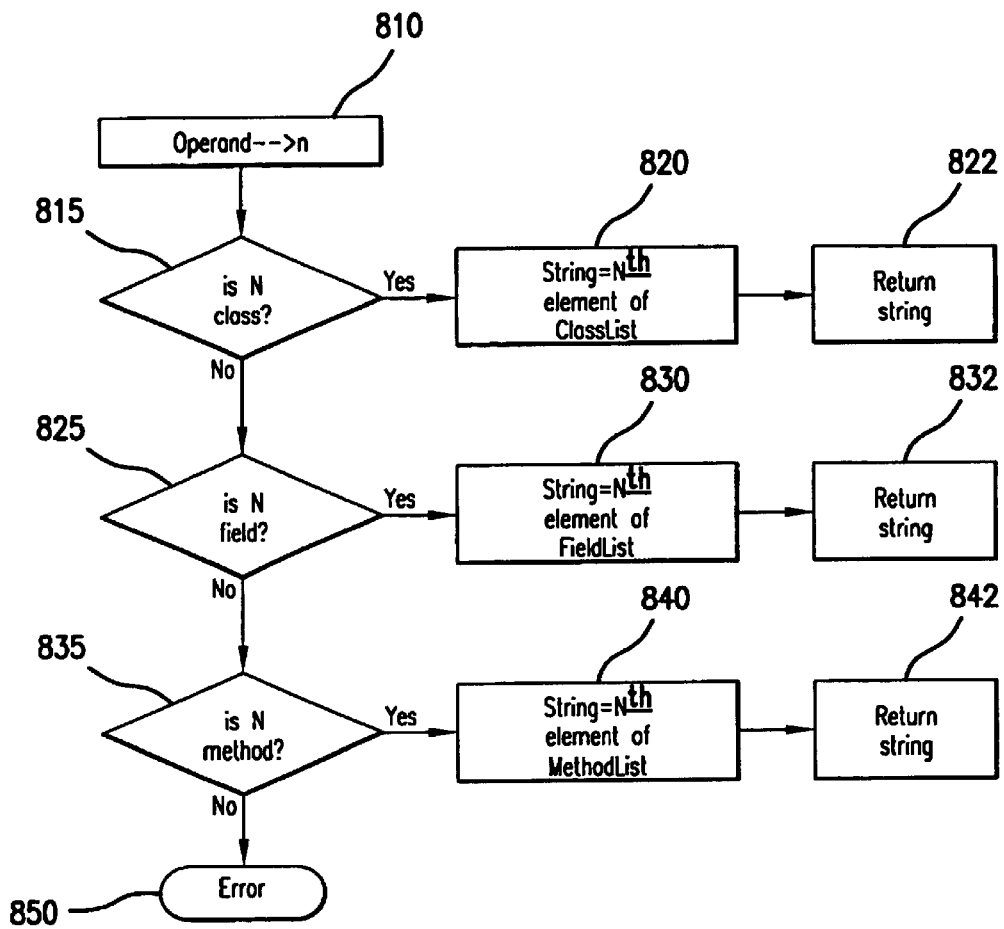
FIG. 12 is a flow diagram of an exemplary method of resolving operands of bytecode condensed in accordance with the present invention.

FIG. 12 illustrates an exemplary procedure for resolving operands in accordance with the present invention. In step 810, the operand to be resolved is assigned to a variable N. In step 815, it is determined whether the operand is a class. As discussed above, the type of operand is implied from the opcode. If the operand N is a class, operation proceeds to step 820 in which the operand itself is used as an index into the canonical list of classes formed in step 380 (FIG. 7). Using the operand as an index, a string is retrieved from the ClassList which is the identifier of the class which is the operand. In the alternative, using the operand as an index, other attributes relevant for the instruction to be executed (e.g., object size, number of defined methods, superclass ID) which are stored in the ClassList for the class which is the operand can be retrieved from the ClassList. The retrieved string replaces the index, and operation either proceeds to step 740, if all operands that need to be resolved have been resolved, or to step 810 if there are more operands to be resolved.

If in step 815 it is determined that the operand N is not a class, operation proceeds to step 825 in which it is determined whether the operand to be resolved is a field. If it is determined that the operand N is a field, operation proceeds to step 830 in which the operand itself is used as an index into the canonical list of fields formed in step 390 (FIG. 7). Using the operand as an index, a string is retrieved from the FieldList-which is the name of the field which is the operand. In the alternative, using the operand as an index, other attributes relevant for the instruction to be executed (e.g., offset within object and length) which are stored in the FieldList for the field which is the operand can be retrieved from the FieldList. The retrieved string replaces the index, and operation either proceeds to step 740, if all operands to be resolved have been resolved, or to step 810 if there are more operands to be resolved.

If in step 825 it is determined that the operand N is not a field, operation proceeds to step 835 in which it is determined whether the operand to be resolved is a method. If it is determined that the operand N is a method, operation proceeds to step 840 in which the operand itself is used as an index into the canonical list of methods formed in step 385 (FIG. 7). Using the operand as an index, a string is retrieved from the MethodList which is the name of the method which is the operand. In the alternative, using the operand as an index, other attributes relevant for the instruction to be executed (e.g., number of arguments, length and location of bytecode, etc.) which are stored in the MethodList for the method which is the operand can be retrieved from the MethodList. The retrieved string replaces the index, and operation either proceeds to step 740, if all operands that need to be resolved have been resolved, or to step 810 if there are more operands to be resolved.

If in step 835 it is determined that the operand N is not a method, then an error condition is indicated in step 835. In the exemplary embodiment of the present invention, the bytecode 72 has operands which are classes, methods or fields.

It should be noted that bytecode condensed in accordance with the present invention can be interpreted and executed, as-is, without the class, method and field lists. For example, if class #5 has 4 methods, the third of which is method #778, and this method creates new objects of class type #7 and calls this object's method #556, the original names or identifiers of classes 5 or 7, or of methods 778 or 556 are not needed to properly interpret and execute the bytecode.

One skilled in the art will appreciate that the present invention can be practiced by other than the preferred embodiments which are presented for purposes of illustration and not of limitation, and the present invention is only limited by the claims which follow.

What is claimed is:

1. A method of resolving condensed computer code having a plurality of types of code structures, each of the types of code structures including a plurality of index references, the method comprising the steps of:

reading a list of identifiers for each type of code structure, each list including an index reference corresponding to each of the identifiers in the list; and replacing each of the index references in the computer code with the respective identifier corresponding to each respective index reference.

2. The method of claim 1, wherein:

the types of code structures comprise classes, methods and fields; and reading the list of identifiers for each type of code structure comprises reading a list of classes, a list of methods, and a list of fields.

* * * * *